(12) United States Patent
Morin et al.

(10) Patent No.: US 6,230,129 B1
(45) Date of Patent: May 8, 2001

(54) SEGMENT-BASED SIMILARITY METHOD FOR LOW COMPLEXITY SPEECH RECOGNIZER

(75) Inventors: Philippe R. Morin; Ted H. Applebaum, both of Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/199,721

(22) Filed: Nov. 25, 1998

(51) Int. Cl.[7] .............................. G10L 15/02; G10L 15/20
(52) U.S. Cl. ......................... 704/254; 704/251; 704/231
(58) Field of Search ................................... 704/231, 234, 704/238, 239, 240

(56) References Cited

U.S. PATENT DOCUMENTS

| | | |
|---|---|---|
| 5,345,536 | 9/1994 | Hoshimi et al. . |
| 5,513,297 * | 4/1996 | Kleijn et al. ........................ 704/222 |
| 5,522,011 * | 5/1996 | Epstein et al. ....................... 704/222 |
| 5,664,061 * | 9/1997 | Andreshak et al. .................. 704/231 |
| 5,684,925 * | 11/1997 | Morin et al. ........................ 704/243 |
| 5,806,034 * | 9/1998 | Naylor et al. ........................ 704/256 |
| 5,822,728 | 10/1998 | Morin et al. . |
| 5,825,977 | 10/1998 | Morin et al. . |

OTHER PUBLICATIONS

"Noise Compensation Methods for Hidden Markov Model Speech Recognition in Adverse Environments", S. V. Vaseghi and B. P. Milner, IEEE Trans. Speech and Audio-Processing, vol. 5, pp. 11–21, Jan. 1997.

"A Phoneme–Similarity Based ASR Front–End", P. Morin, T.H. Applebaum, and B.A. Hanson, Proc. International Conf. Acoustics Speech and Signal Processing, vol. 1, pp. 33–36, 1996.

(List continued on next page.)

*Primary Examiner*—Richemond Dorvil
*Assistant Examiner*—Daniel A. Nolan
(74) *Attorney, Agent, or Firm*—Harness, Dickey & Pierce, P.L.C.

(57) ABSTRACT

A digital word prototype is constructed using one or more speech utterance for a given spoken word or phrase. First, a phone model is used to derive phoneme similarity time series for each of a plurality of phonemes which represent the degree of similarity between the speech utterance and a set of standard phonemes contained in the phone model. Next, the phoneme similarity data is normalized in relation to a non-speech part of the input speech signal. The normalized phoneme similarity data is divided into segments, such that the sum of all normalized phoneme similarity values in a segment are equal for each segment. Next, a word model is constructed from the phoneme similarity data. To do so, within each segment, a summation value is determined by summing over speech frames each of the normalized phoneme similarity values associated with a particular phoneme. In this way, the word model is represented by a vector of summation values that compactly correlate to the normalized phoneme similarity data. Lastly, the results of the individually processed utterances for a given spoken word (i.e., the individual word models) are combined to produce a digital word prototype that electronically represents the given spoken word.

11 Claims, 5 Drawing Sheets

OTHER PUBLICATIONS

"Word Hypothesizer Based on Reliably Detected Phoneme Similarity Regions", P. Morin and T.H.Applebaum, Proc. Eurospeech, pp. 897–900, 1995.

"Recognition Strategies for Lombard Speech", P. Morin, T.H. Applebaum and B.A. Hanson, Proc. ESCA–NATO Tutorial and Research Workshop on "Speech Under Stress", Lisbon, Portugal, 1995.

"Speaker Independent Speech Recognition Method Using Phoneme Similarity Vector", M. Hoshimi, J. Yamada, and K. Niyada, Proc. International Conf. Speech and Lang. Processing, vol. 3, pp. 1915–1958, 1994.

"Speaker Independent Speech Recognition Method Using Training Speech from a Small Number of Speakers", M. Hoshimi, M. Miyata, S. Hiraoka, and K. Niyada, Proc. International Conf. Acoustics Speech and Signal Processing, vol. 1, pp. 469–472, 1992.

"Speaker Independent Speech Recognition Method Using Word Spotting Technique and Its Applications to VCR Programming", H. Kuwano, K. Nomura, A. Ookumo, S. Hiraoka, T. Watanabe, and K. Niyada, Proc. International Conf. Speech and Lang. Processing, 1992.

"Keyword Spotting in Noisy Continuous Speech Using Word Pattern Vector Subabstraction and Noise Immunity Learning", Y. Takebayashi, H. Tsuboi, and H. Kanazawa, Proc. International Conf. Acoustics Speech and Signal Processing, vol. II, pp. 85–88, 1992.

"Robust Speech Recognition System Using Word–Spotting with Noise Immunity Learning", Y. Takebayashi, H. Tsuboi, and H. Kanazawa, Proc. International Conf. Acoustics Speech and Signal Processing, pp. 905–908,1991.

"VINICS: A Continuous Speech Recognizer Based on a New Robust Formulation", Y. Gong and J.P. Haton, Proc. European Conf. .Speech Comm. And Tech. (Eurospeech), pp. 1221–1224, 1991.

"Recent Developments in Speech Recognition Under Adverse Conditions", F.H. Juang, Proc. 1990 Internat. Conf. Spoken Lang. Processing, pp. 1113–1116, Kobe Japan, 1990.

* cited by examiner

|  | Segment No. | | |
|---|---|---|---|
| Phoneme No. | 1 | 2 | 3 |
| 1 | 55 | 12 | 201 |
| 2 | 16 | 205 | 167 |
| 3 | 111 | 26 | 4 |
| . | . | . | . |
| . | . | . | . |
| . | . | . | . |
| 55 | 95 | 73 | 26 |

FIG. 6

|  | Segment No. | | | | | |
|---|---|---|---|---|---|---|
|  | 1 | | 2 | | 3 | |
| Phoneme No. | Mean | Weight | Mean | Weight | Mean | Weight |
| 1 | 60 | 3 | 17 | 28 | 227 | 2 |
| 2 | 18 | 15 | 210 | 31 | 143 | 16 |
| 3 | 120 | 4 | 50 | 17 | 29 | 17 |
| . | . | . | . | . | . | . |
| . | . | . | . | . | . | . |
| . | . | . | . | . | . | . |
| 55 | 91 | 26 | 73 | 5 | 111 | 25 |

FIG. 7

SEGMENT-BASED SIMILARITY METHOD FOR LOW COMPLEXITY SPEECH RECOGNIZER

BACKGROUND AND SUMMARY OF THE INVENTION

The present invention relates generally to speech recognition systems, and more particularly, the invention relates to a system for representing a given speech utterance as a digital word prototype. The prototype is based on segment-based phoneme similarity data, resulting in a highly compact, data-driven representation of speech.

Conventional speech processing technology starts with a digitized speech utterance and then analyzes the digitized data in blocks comprising a predetermined number of samples. Thus, the conventional system breaks the incoming speech signal into time segments so that each segment can be analyzed and coded separately. With the conventional technique it is therefore common practice to store a fixed number of feature parameters per time segment or frame. Common practice is to analyze speech at a fixed frame rate of 50 to 100 frames per second and represent speech by a fixed number of feature parameters in each frame. These feature parameters are usually the parameters of a parametric model of the short term spectral shape and their derivatives.

Hoshimi et al., U.S. Pat. No. 5,345,536 proposed a speech representation also employing a fixed number of feature parameters per analysis frame, in which the feature parameters are phoneme similarity values. In this representation, it is not necessary to store all phoneme similarity values for each frame, but to store the phoneme similarity value and phoneme index of the M (e.g. M=6) largest phoneme similarity values (e.g. 12 parameters per frame, or 1200 parameters per second, assuming 100 frames per second).

These conventional high data rate systems then compare the feature parameters, element by element, between the reference prototype (derived from the training data) and the unknown speech data. The number of comparisons is thus proportional to the square of the number of parameters used. Hence high data rate systems produce a high computational overhead that may rule out slower, less expensive processors that would otherwise be desirable for use in low cost consumer products.

In a similar approach, Morin et al., U.S. Pat. No. 5,684,925, proposed an alternative approach to the digitized speech coding problem. This approach replaces the frame-based prototype with a feature-based prototype. More specifically, its recognition strategy is based on "targets" which characterize reliably found regions of high phoneme similarity (i.e., the number of high similarity regions found in S segments of equal time duration). Unlike frames, targets do not occur at a fixed rate per second. Instead of devoting equal computational energy to each frame in the utterance (as other conventional systems do), this approach concentrates its computational energy on only those high similarity regions with features that rise above a predetermined similarity threshold. This results in a data-driven digital prototype that can be used to electronically represent speech with roughly a fivefold to tenfold reduction in data rate. Because of the square law relationship described above, the reduced data rate substantially reduces computational overhead.

While the feature-based prototype performed well as a fast-match stage for finding the best word candidates, the feature-based prototype is not accurate and robust enough as a speech recognizer that selects the one best word candidate, especially in the case of noise and channel mismatch. Degradation was shown to come from (1) the use of thresholds in the detection of high similarity regions within the similarity time series and (2) the frame-based segmentation method in which segments were identified by dividing the utterance into S segments of equal time duration.

Thus, the present invention replaces the frame-based prototype with a more robust segment-based prototype. Instead of a discrete approach, a continuous approach is implemented to more completely account for the information held within the high similarity regions. Rather than using a threshold detection method, each of the phoneme similarity values are summed together to construct a word model. This continuous approach results in greater resolution, and yet still provides a compact word model size.

Furthermore, the segment-based prototype of the present invention employs an improved segmentation method. The segmentation method divides the utterance into S segments based on the sum of the phoneme similarity values in each segment. This allows for a fast static alignment of the test utterance that is independent of time.

Generally, the present invention represents a given speech utterance as a digital word prototype according to the following method. The word prototype is built by providing at least one utterance of training speech for a particular word. In order to increase the reliability of the phoneme similarity data found in the training data, two or more training utterances may also be used to construct the digital word prototype. Training utterances may be obtained from a given single speaker ("Speaker-Dependent" training), a large number of highly diverse representative speakers ("Speaker-Independent" training) or some other distribution of speakers (e.g. "Cross-Speaker" training).

For each given spoken utterance, the corresponding input signal is processed to obtain phoneme similarity values for each phoneme symbol in each time frame. The spoken utterance is then segmented. The phoneme similarity data is first normalized by subtracting out the background noise level found within the non-speech part of the input signal. To do so, the normalized phoneme similarity data is divided into segments, such that the sum of all normalized phoneme similarity values in a segment are equal for each segment. For each particular phoneme, a sum is determined from each of the normalized phoneme similarity values within each of the segments. Next, a word model is constructed from the normalized phoneme similarity data. In other words, the word model is represented by a vector of summation values that compactly correlate to the normalized phoneme similarity data. Lastly, the results of individually processed utterances for a given spoken word (i.e., the individual word models) are combined to produce a digital word prototype that electronically represents the given spoken word.

For a more complete understanding of the invention, its objects and advantages refer to the following specification and to the accompanying drawings.

BRIEF DESCRIPTION OF THE DRAWINGS

FIG. 6 is an exemplary portion of a word (or phrase) model in accordance with the present invention; and FIG. 7 is an exemplary portion of a word (or phrase) prototype in accordance with the present invention.

DETAILED DESCRIPTION OF THE PREFERRED EMBODIMENTS

Figure 1:
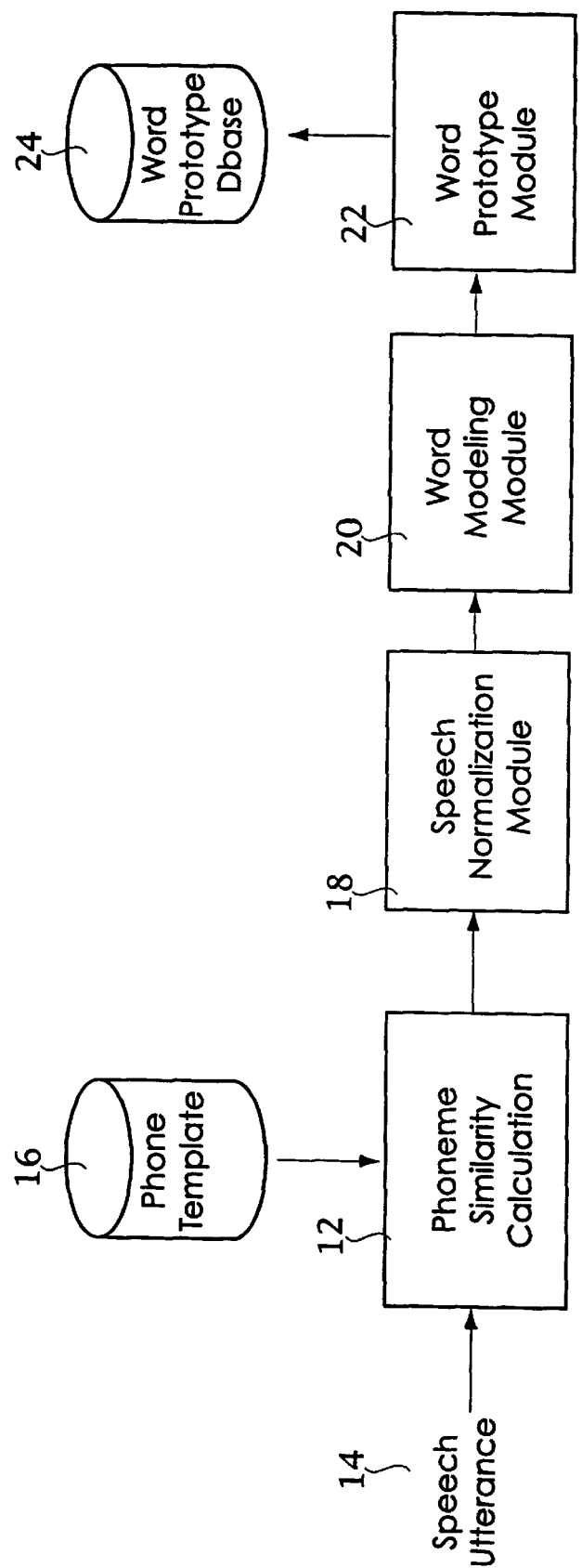
FIG. 1 is a block diagram illustrating the word prototype training system of the present invention.

FIG. 1 gives an overview of a system for constructing segment-based digital word prototypes. Each word prototype is constructed using one or more speech utterances for a given spoken word (or phrase). A phoneme similarity calculation module 12 processes an input signal that corresponds to the speech utterance 14 to produce a phoneme similarity time series. The phoneme similarity calculation module 12 uses a phone model or template 16 to derive phoneme similarity curves which represent the degree of similarity between the speech utterance 14 and the standard phonemes contained in the phone model 16. This may be accomplished according to the teachings of Hoshimi et. al., cited above.

A speech normalization module 18 then partitions the input signal into a speech part and a non-speech part in order to normalize the phoneme similarity data (e.g., by the teachings Reaves, U.S. Pat. No. 5,826,230). The phoneme similarity data is normalized by subtracting out the background noise level found within the non-speech part of the input signal.

Next, the speech utterance is divided into a predefined number of segments, such that the sum of all the normalized phoneme similarity values of a segment are equal for each segment. A word model is then constructed from the normalized phoneme similarity data by a word modeling module 20. Within each segment, a summation value is determined by summing each of the normalized phoneme similarity values associated with a particular phoneme. In this way, the word model is represented by a vector of summation values that compactly correlate to the normalized phoneme similarity data.

If more than one training utterances are provided, then a word prototype module 22 combines each of the word models corresponding to a training speech utterance in order to build a digital word prototype data that electronically represents the given spoken word. The word prototype consists of pairs of parameters for each phoneme in each segment. Each parameter pair comprises the average over the word models of the summation values, and a corresponding weight which is derived from the corresponding variance of the summation values. The digital word prototype is stored in a word prototype database 24.

Figure 2:
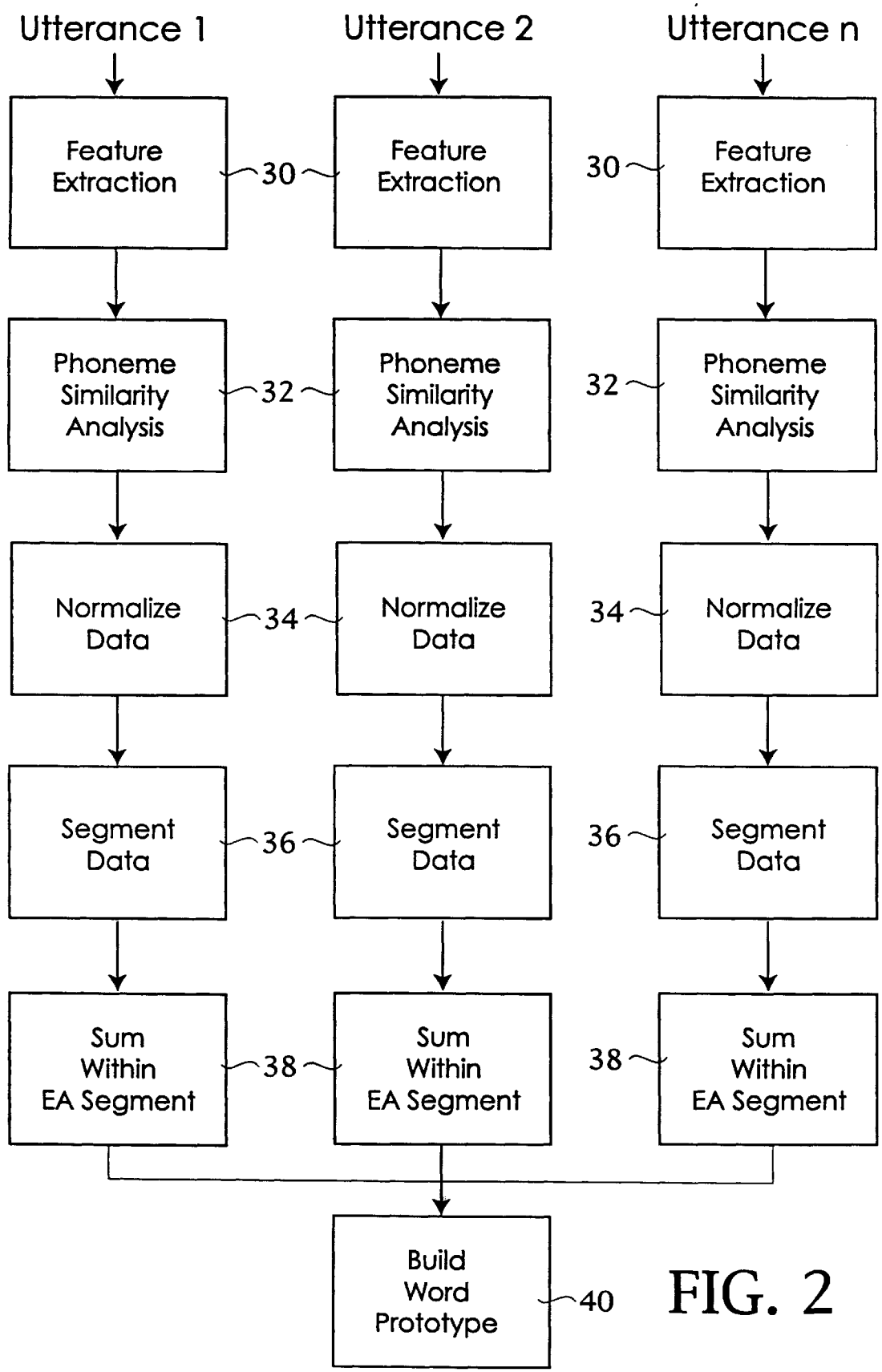
FIG. 2 comprises a flow diagram depicting an overview of the system for representing speech as segment-based word prototypes in accordance with the present invention.

FIG. 2 more fully illustrates how the segment-based word prototypes are constructed. One or more speech utterances which correspond to a given spoken word or phrase are used to construct a word model. These utterances may be by the same speaker or by different speakers. Each utterance is processed separately up to a certain point, as illustrated in FIG. 2. Ultimately, the results of the individually processed utterances are combined to produce a digital word prototype for the given spoken word.

Each utterance is first subjected to feature extraction signal processing as depicted at step 30. This involves digitizing the speech utterance into an input signal and storing it in an input speech database. At this point, the input signal encapsulates the speech and the non-speech part of the utterance.

Figure 3:
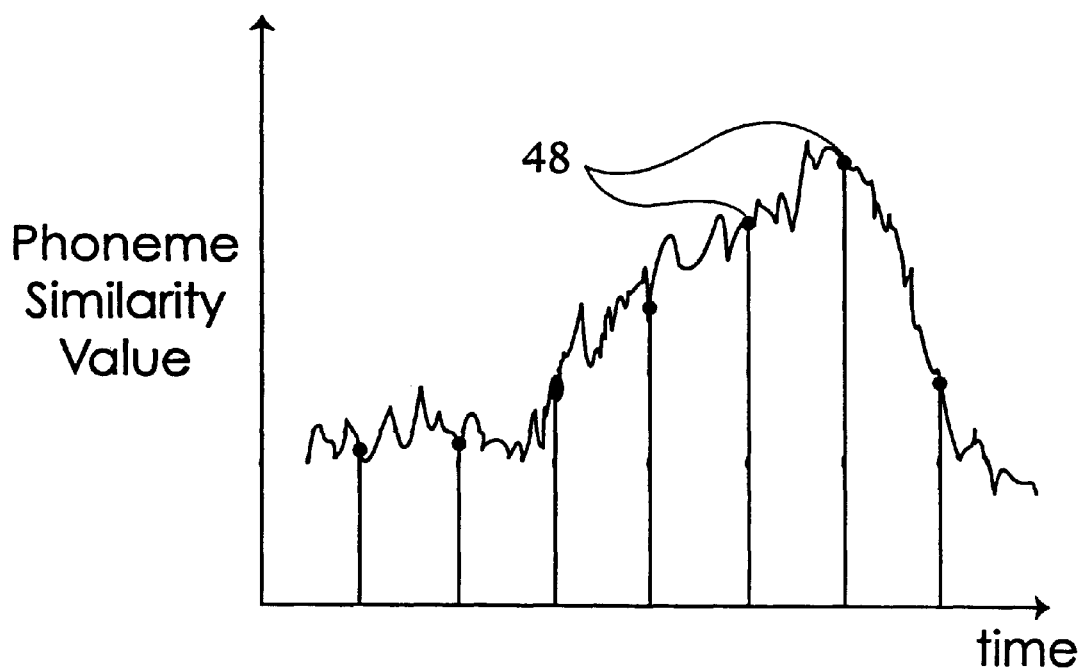
FIG. 3 is a graph illustrating a time series of phoneme similarity values produced by the phoneme similarity analysis of the present invention.

A phoneme similarity analysis is performed on the digitized input signal as at step 32. Phoneme similarity data is computed for each phoneme in the phoneme model. Phoneme similarity data is generally comprised of a time series of phoneme similarity values 48 as shown in FIG. 3. Each phoneme similarity value represents a probability that the digitized speech sample correlates to a particular phoneme at a given discrete time. The probability value is then made into an integer, such that the larger the phoneme similarity value, the greater the similarity between the speech sample and the phoneme.

Figure 4:
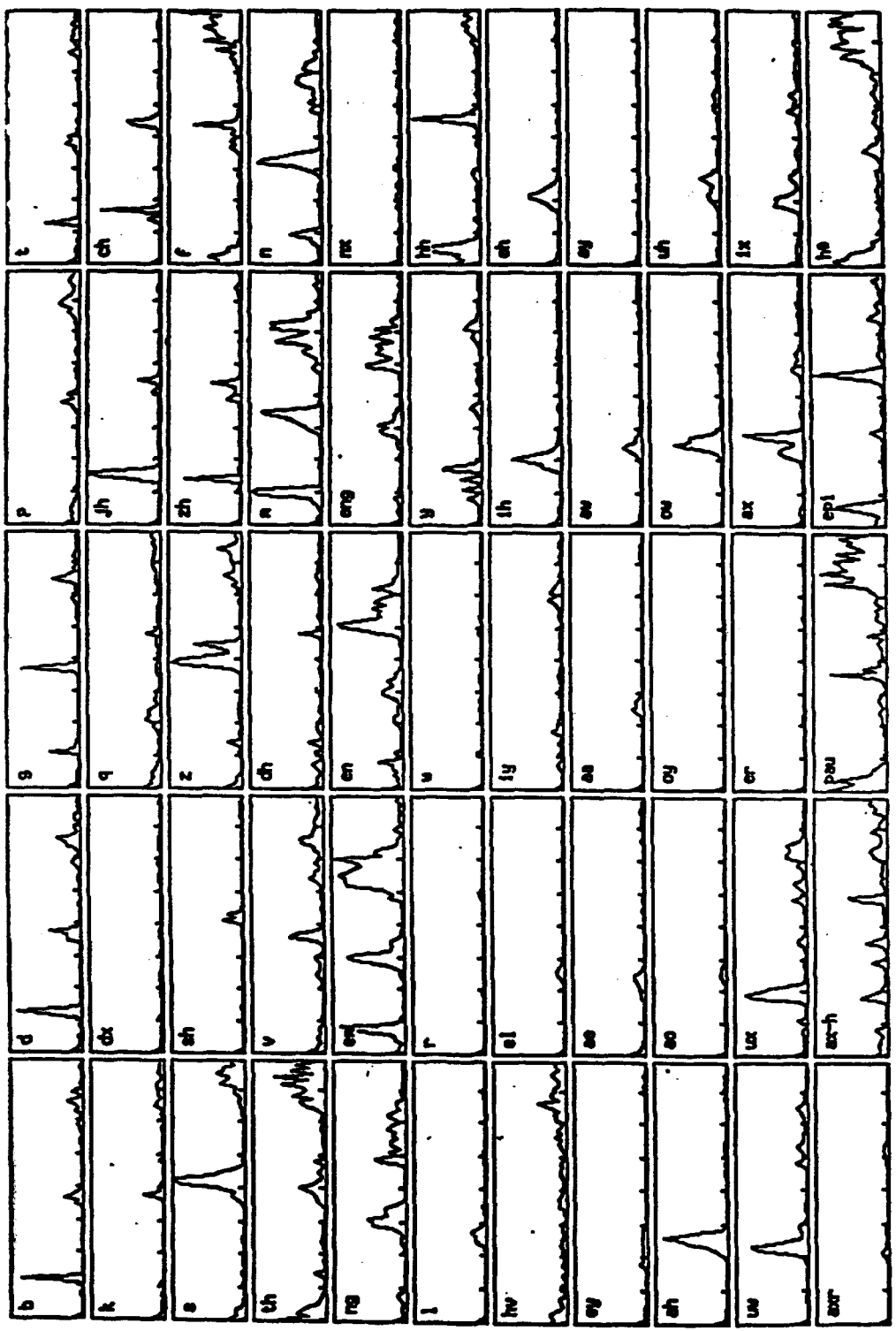
FIG. 4 is a set of graphs that shows the phoneme similarity curves for the word "Johnson"

For an English language model, the presently preferred embodiment breaks down speech into 55 phonemes which collectively correspond to the different sounds that make up speech. FIG. 4 illustrates exemplary data in a 5×11 grid corresponding to the 55 phonemes. The phoneme similarity data illustrated in FIG. 4 is for the spoken word "Johnson". By way of illustration, the phoneme "s" contains several regions of high phoneme similarity values for this particular utterance; whereas the phoneme "er" contains no high phoneme similarity values for this particular utterance. The phoneme similarity analysis is preferably performed periodically so that every 10 milliseconds of the input signal is captured by a vector of 55 components which represents the phoneme similarity data.

Figure 5:
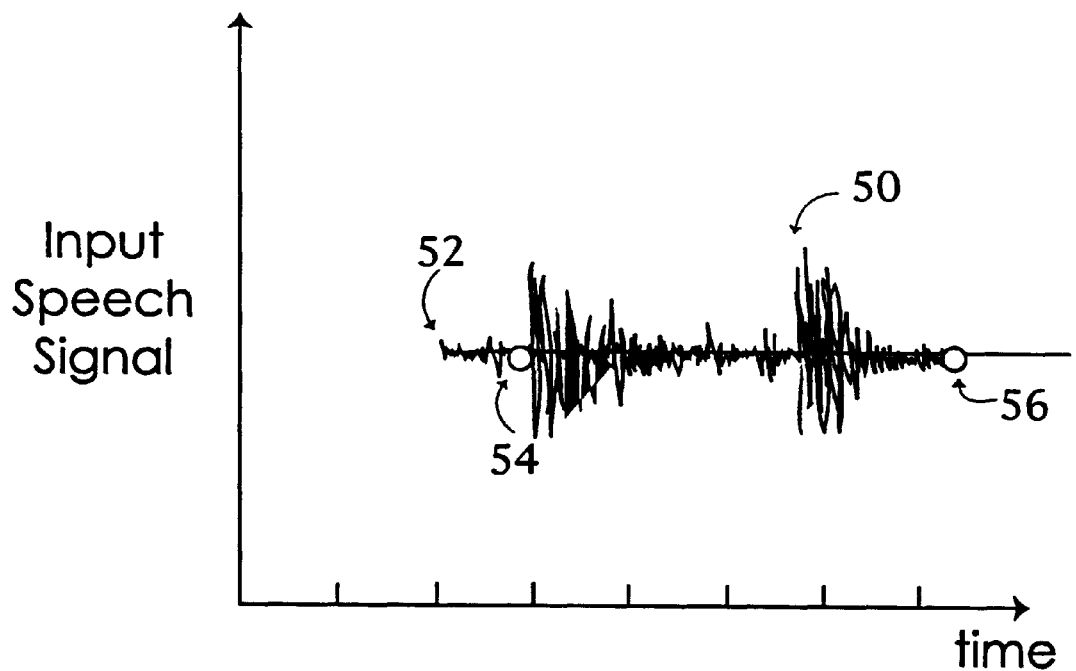
FIG. 5 is a graph illustrating the speech part and the non-speech part of a representative input signal.

As illustrated in step 34, the phoneme similarity data is normalized using the non-speech part of the input signal. Referring to FIG. 5, each input signal is partitioned into a speech part 50 and a non-speech part 52 using an end point detection procedure. As is well known in the art, the end point detection procedure detects the beginning point 54 and the end point 56 of the speech part 50. A background noise level ($B_p$) is computed by averaging the phoneme similarity values for the p-th phoneme over K frames of the non-speech part 52 of the input signal. Each of the phoneme similarity values ($U_p$) from the input signal are normalized by subtracting this background level as follows:

$$N_p = |(U_p - B_p)|,$$

where $N_p$ is a normalized phoneme similarity value for the $P^{th}$ phoneme. In this way, much of the noise captured along with the speech data can be filtered out of the phoneme similarity data.

As a result, the normalized phoneme similarity data primarily represents the speech part of the input signal. Because the non-speech part of input signal is on the order of zero, the non-speech part of the input signal (which may or may not be included between the endpoints) does not strongly affect the phoneme similarity data used to determine the word segment boundaries. In other words, this approach is robust to imprecise estimates of the word endpoints.

A word model is then constructed from the normalized phoneme similarity data. To do so, the normalized phoneme similarity data is first divided into S segments in step 36, such that the sum of all normalized phoneme similarity values in a segment are equal for each segment. In other words, all of the normalized phoneme similarity values for each of the phonemes are added together and then divided by the number of desired segments. In the preferred embodiment, the preferable number of segments is three. It is also envisioned that a word model can be constructed without segmenting the phoneme similarity data (i.e., by only using a single segment).

For each particular phoneme, a summation value is then determined in step 38 by summing each of the normalized phoneme similarity values in the segment. More specifically, the summation value is preferably a Root Sum Square (RSS) value for the s-th segment and the p-th phoneme that is computed as shown below:

$$RSS_{sp} = \sqrt{\Sigma U^2_{fp}}$$

Note that the summation is taken over all of the frames in the s-th segment. The above equation naturally places an emphasis on the high phoneme similarity values by first squaring of each normalized phoneme similarity values. While the above description is provided with reference to using normalized phoneme similarity data to compute the summation values, it is readily understood that the (unnormalized) phoneme similarity data may alternatively be used to compute the summation values, and yet the normalized phoneme similarity data is still used to determine the size of each segment.

Accordingly, a word model is represented as a vector having 165 word model parameters (i.e., assuming 55 phonemes and 3 segments per word), where each word model parameter is a summation value. An exemplary portion of a word model is depicted in FIG. 6. Rather than identify only the high similarity regions through the use of threshold detection methods, the present invention accounts for all of the phoneme similarity values. In this way, word model provides more information about the phoneme similarity regions for a particular utterance, and yet it still compactly represents this phoneme similarity data. It is envisioned that a single word model corresponding to an individual training utterance may be used as the digital word prototype.

However, it is more likely that a plurality of individually processed training utterances for a given spoken word are used for construct a digital word prototype. Each word model corresponding to a training utterance is combined to produce the digital word prototype. Thus, the word prototype is also a vector as shown in FIG. 7. In this case, the vector has 330 parameters. For each phoneme-segment pair there are two parameters: (1) a mean value and (2) a weight value. The mean value is determined from the summation values from each of the word models used to construct the word prototype by summing over all of the word models; whereas the weighting value associated with this mean value is computed as follows:

$$W_{sp} = (A*B) \div (B + C*U_{sp})$$

where $W_{sp}$ is the weight for the $S^{th}$ segment and the $P^{th}$ phoneme,

A is the maximum magnitude of the phoneme similarity values,

B is a small floor value for phoneme similarity values (B>0),

C is a multiplicative gain on the variance of the similarity values, and $V_{sp}$ is the variance of the phoneme similarity value at the $S^{th}$ segment and $P^{th}$ phoneme.

Thus, the weighting factor signifies how reliable the particular mean value is in relation to training utterances used to construct the word prototype.

These word prototypes can be used in recognition of an unknown utterance by computing the weighted Euclidean distance between S segments of the unknown utterance and the S segments of the word prototype. The weighted Euclidean distance is computed as follows:

Weighted Euclidean Distance =

$$\sqrt{\sum_{s=1}^{S}\sum_{p=1}^{P} W_{sp} * (U_{sp} - R_{sp})^2 \div \sum_{s=1}^{S}\sum_{p=1}^{P} W_{sp}}$$

where $U_{sp}$ is the RSS value for the $S^{th}$ segment and $P^{th}$ phoneme in the unknown utterance, $R_{sp}$ is the Mean RSS for the $S^{th}$ segment and $P^{th}$ phoneme in the word prototype, and $W_{sp}$ is the weight for the $S^{th}$ segment and the $P^{th}$ phoneme in the word prototype. In this case, the weighting factor used in computing the weighted Euclideam distance is computed from the inverse variance associated with the corresponding segment.

Word candidates are ranked by the weighted Euclidean distance between the unknown utterance and the corresponding word prototypes, such that the best candidate having the smallest distance. Therefore, the segment-based approach of the present invention allows for fixed alignment of an unknown utterance with a word prototype, thereby eliminating the need for a computationally expensive search for the best alignment as is done in many other kinds of time-dependent speech recognition methods.

The foregoing discloses and describes merely exemplary embodiments of the present invention. One skilled in the art will readily recognize from such discussion, and from accompanying drawings and claims, that various changes, modifications, and variations can be made therein without the departing from the spirit and scope of the present invention.

What is claimed is:

1. An apparatus for representing a given speech utterance as a digital word prototype, comprising:

a phone model database for storing phone model speech data corresponding to a plurality of phonemes;

a phoneme similarity module connected to said phone model database and receptive of said given speech utterance for producing phoneme similarity data indicative of the correlation between the given speech utterance and said phone model speech data with respect to time;

a speech normalization module receptive of said phoneme similarity data for normalizing said phoneme similarity data with respect to a non-speech part of the given speech utterance wherein said speech normalization module normalizes said phoneme similarity data by generating an average phoneme similarity value based on the phoneme similarity data in the non-speech part of the given speech utterance and subtracting said average phoneme similarity value from each of the phoneme similarity values associated with said phoneme similarity data; and a word modeling module receptive of said phoneme similarity data and normalized phoneme similarity data for building word model data by segmenting the normalized phoneme similarity data into at least one segment and determining a sum for the normalized phoneme similarity data in each of said segments, thereby electronically representing the given speech utterance using said word model data.

2. The apparatus of claim 1 wherein said phoneme similarity data is segmented into at least three segments by said word modeling module, such that the sum of said phoneme similarity data including said plurality of phonemes is equal in each of said segments.

3. The apparatus of claim 2 wherein said sum being further defined as a Root Sum Square (RSS) value of the phoneme similarity data for each phoneme in each of said segments.

4. An apparatus for representing a given speech utterance as a digital word prototype, comprising:

a phone model database for storing phone model speech data corresponding to a plurality of phonemes;

a phoneme similarity module connected to said phone model database and receptive of the given speech utterance for producing phoneme similarity data indicative of the correlation between the given speech utterance and said phone model speech data with respect to time;

a speech normalization module receptive of said phoneme similarity data for normalizing said phoneme similarity data with respect to a non-speech part of the given speech utterance by averaging the phoneme similarity data in the non-speech part of the given speech utterance signal and subtracting an average phoneme similarity value from each of the phoneme similarity values associated with said phoneme similarity data; and a word modeling module receptive of said phoneme similarity data and said normalized phoneme similarity data for building word model data corresponding to said phoneme similarity data, thereby electronically representing the given speech utterance using said word model data.

5. The apparatus of claim 4 wherein said word modeling module forms word model data by segmenting the normalized phoneme similarity data into at least one segment and determining a sum for the phoneme similarity data in each of said segments.

6. The apparatus of claim 5 wherein said normalized phoneme similarity data being segmented into at least three segments by said word modeling module, such that the sum of said normalized phoneme similarity data being equal in each of said segments.

7. The apparatus of claim 5 wherein said sum being further defined as a Root Sum Square (RSS) value for the phoneme similarity data in each of said segments.

8. A method of representing a given spoken word as a digital word prototype, comprising the steps of:

providing phone templates representing a database of standard speech;

comparing a first training instance with said phone templates to produce first phoneme similarity data as a function of time, said first training instance corresponding to the given spoken word;

normalizing said first phoneme similarity data with respect to a non-speech part of said first training instance by averaging the phoneme similarity data in the non-speech part of said first training instance and subtracting an average phoneme similarity value from each phoneme similarity value associated with said first phoneme similarity data; and building first word model data corresponding to said first phoneme similarity data by segmenting said first phoneme similarity data into at least one segment and determining a sum for said first phoneme similarity data in each of said segments, thereby forming the digital word prototype that represents the given spoken word.

9. The method of claim 8 further comprises segmenting said normalized first phoneme similarity data into at least three segments, such that the sum of said normalized first phoneme similarity data being equal in each of said segments.

10. The method of claim 8 wherein the step of building word models data further comprises determining a root sum square (RSS) value for said first phoneme similarity data in each of said segments.

11. The method of claim 8 further comprises:

comparing a second training instance with said phone templates to produce second phoneme similarity data as a function of time, said second training instance corresponding to the given spoken word;

building second word model data corresponding to said second phoneme similarity data by segmenting said second phoneme similarity data into a plurality of segments and determining a sum for said second phoneme similarity data in each of said segments; and computing a mean sum and a weight for each of said phonemes in each of said segments, thereby forming the digital word prototype that represents the given spoken word.

* * * * *